United States Patent Office 3,472,724
Patented Oct. 14, 1969

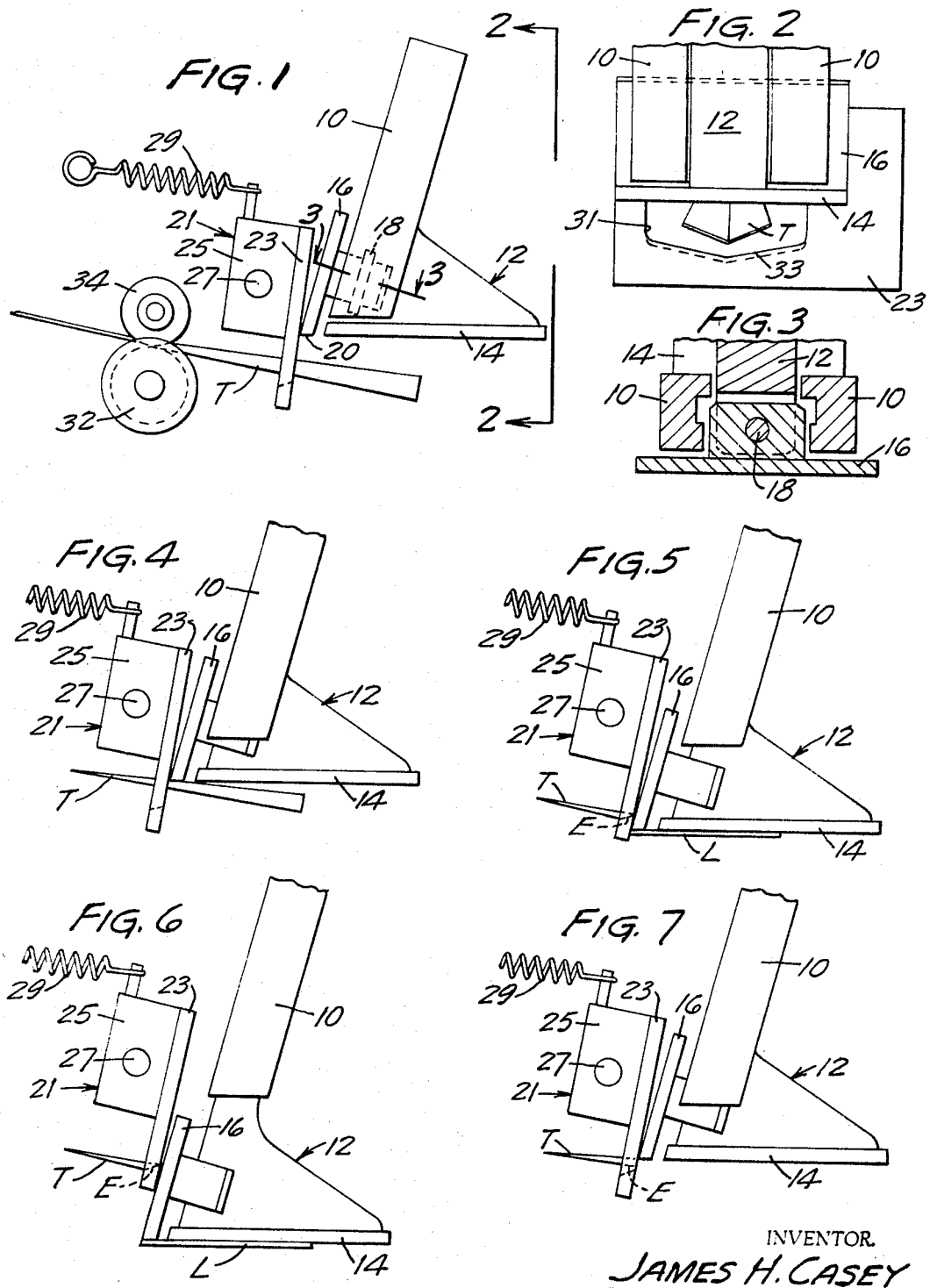

3,472,724
APPARATUS FOR SEVERING TAPE
James H. Casey, Roseville, Minn., assignor to Minnesota Mining and Manufacturing Company, St. Paul, Minn., a corporation of Delaware
Filed Dec. 10, 1965, Ser. No. 513,058
Int. Cl. B65h 35/06
U.S. Cl. 156—521                3 Claims

ABSTRACT OF THE DISCLOSURE

The apparatus provides two shear members for severing a length of adhesive tape from a supply thereof. The first shear member is movable in one direction and then in a second direction, and the movable second shear member is caused to be moved in the direction toward the supply of tape by the first shear member when the first shear member is moved in the first direction to sever tape which extends between the shear members, causing the adhesive surface of the end of tape from the supply thereof to become adhered to the second shear member. Then, when the first shear member is moved in the second direction, the second shear member is moved in the direction away from the supply of tape to cause the end of tape from the supply thereof to become disadhered from the second shear member.

---

The present invention relates to an apparatus which is useful for severing a length of adhesive tape from a supply thereof. This apparatus is particularly useful in connection with pressure-sensitive adhesive tape, because such tape is tacky and tends to become adhered to almost any surface with which the adhesive surface of the tape comes into contact.

The apparatus of the present invention includes a supporting structure, a first shear member which is movably attached to that supporting structure, means for moving that first shear member first in one direction and then in a second direction, a second shear member movably attached to the supporting structure in a position adjacent to the first shear member so that the second shear member is caused to be moved in the direction toward the supply of tape by the first shear when the first shear member is moved in the first direction to sever tape which extends between the first and second shear members, causing the adhesive surface of the end of tape from the supply thereof to become adhered to the second shear member. Means is provided for moving the second shear member in the direction away from the supply of tape when the first shear member is moved in the second direction, to cause the end of tape from the supply thereof to become disadhered from the second shear member.

While tape severing apparatus including two shear members has been available previously, it has been necessary heretofore to provide a means for reversing the direction of the movement of the tape from the supply thereof after a length of tape has been severed therefrom, in order to disadhere the end of the tape from the supply thereof from the second shear member. The present invention eliminates any necessity for the reversing mechanism of the previous machines, and provides a more simple and efficient mechanism for providing the same result at a substantial reduction in cost in manufacturing the apparatus. Also, the present invention provides for the movement of each of the shear members with respect to each other, so the shear members tend to align themselves along the area of contact with each other and the adjustment of the parts to close tolerances is not necessary. Additionally, the shear member of the present invention can cut tapes made on the thinner film backings more easily than the prior machines and the cutting edges will function more effectively for a longer time.

Other objects and advantages of this invention will be apparent from the following detailed description of the embodiment which is shown in the accompanying drawings, in which drawings:

FIGURE 1 is an elevational view showing the parts of the apparatus in the normal rest position, and with the tape T threaded therein;

FIGURE 2 is a fragmentary elevational view taken along the lines 2—2 of FIGURE 1;

FIGURE 3 is a fragmentary sectional view taken along the lines 3—3 of FIGURE 1; and FIGURES 4 through 7 are fragmentary elevational views similar to FIGURE 1 and showing the relative position of the parts of the apparatus during one complete severing and applying operation.

Referring first to FIGURE 1, it will be understood that a bracket 10 is a part of the supporting structure of a machine and a first shear member 12 is slidably attached in the bracket 10 for reciprocal movement through said bracket. Shear member 12 is provided with a flat tape applying pad 14 which presses against the back surface of the severed length of tape L to apply the length L to an article, as will further be described hereinafter. The shear member 12 is moved through bracket 10 by a double-acting air cylinder or a single-acting and spring return air cylinder, as is well known in the art. A shear blade 16 is attached to shear member 12 by means of a swivel pin 18, as is shown in FIGURES 1 and 3, so that the shear blade 16 is free to pivot at least a small amount on said pin. Also, an edge 20 of the shear blade 16 is beveled and sharpened to provide shearing action across the tape when it is moved in contact with the tape and a shear blade 23 as will be described below.

The second shear member 21 is comprised of a shear blade 23 which is attached to a pivot block 25, and the pivot block 25 is pivotally attached by a pivot pin 27 to the supporting structure of the machine. One end of a spring 29 is attached to the pivot block 25 and the other end of said spring is attached to the supporting structure of the machine. As is shown in FIGURE 1, the pivot pin 27 is positioned so that the shear blade 23 contacts the shear blade 16 is response to the action of the spring 29. As is shown in FIGURE 2, the shear blade 23 is formed to contain a centrally positioned aperture 31, and one edge 33 of the aperture 31 is beveled and sharpened in order to shear the tape T which is threaded through the aperture 31 when the edge 20 of the shear blade 16 is moved across the edge 33 of the aperture 31 in the shear blade 23.

A tape crease wheel 32 is rotatably attached to the supporting structure and means is provided for rotating said wheel intermittently and in the clockwise direction when viewed as shown in FIGURE 1. The peripheral surface of crease whel 32 is formed to contain a deep groove, as is indicated by the dotted lines in FIGURE 1 and said surface is also preferably knurled, since the adhesive surface of the tape T contacts said surface. A guide wheel 34 is rotatably attached to the supporting structure, and the peripheral surface of wheel 34 is formed so that it is narrower than the peripheral surface of the wheel 32, in order that wheel 34 can extend into the groove in wheel 32 as is shown in FIGURE 1. The tape T from a supply roll thereof is fed by feed wheels which are not shown in the drawing and is threaded between the peripheral surfaces of the wheels 32 and 34, with the adhesive surface of the tape facing toward the wheel 32, and the wheel 32 is then rotated as the tape T is fed toward and through the aperture 31 in the shear blade 23 as is shown in FIGURE 1. The passage of the tape T through the groove in the wheel 32 imparts a longitudinal crease in the tape T, as is shown in FIGURES 1 and 2, so that the tape T will extend outwardly therefrom and through the aperture 31, substantially as shown.

The operation of the machine begins with the parts in the position shown in FIGURE 1, and with the tape T threaded as described above. Compressed air is then permitted to enter the drive side of the air cylinder having a cylinder rod to which the first shear member 12 is attached, causing the shear blade 16 to be moved along the shear blade 23 and toward the tape T which extends through the aperture 31. As is shown in FIGURE 4, that movement of the first shear member 12 carrying the shear blade 16 causes the second shear member 21 to be rotated on the pivot pin 27 in the clockwise direction when viewed as shown. That rotational movement of the second shear member 21 is caused by the position of pivot pin 27 relative to the direction of the reciprocating movement of the first shear member 12, and the spring 29 is caused to be extended at that time. Thus the edge 20 of shear blade 16 and the tape applying pad 14 of shear member 12 are moved against the back non-adhesive surface of the tape and carry the tape toward the edge 33 of the aperture 31 in the shear blade 23, and the length of the tape L is severed from the supply thereof, as is shown in FIGURE 5.

When the length of tape L is severed frmo the supply, the adhesive surface of the end of tape E from the supply T is caused to become adhered to the edge 33 of the shear blade 23 as is shown in FIGURE 5. The first shear member 12 stops moving in one direction when it reaches the position in which it is shown in FIGURE 6, and the severed length of tape L is applied to an article against which the adhesive side of the length of tape L is moved into contact.

After the severed length of tape L is applied to an article the first shear member 12 is moved in the opposite direction by stopping the flow of compressed air in to the drive side of the cylinder and allowing the air to be exhausted from that side of the cylinder, and the spring on the cylinder will cause the first shear member 12 to be moved back toward its original position, or compressed air can be permitted to enter the retract side of the cylinder to push it back toward that position. During such movement the pull of spring 29 causes the second shear member 21 to be rotated in the opposite, or counter-clockwise, direction on the pivot pin 27 as such movement is permtted by the withdrawal of the first shear member 12. That counter-rotational movement of the second shear member 21 causes the adhesive surface of the end of the tape E from the supply to become disadhered from the edge 33 of the aperture 31 in the shear blade 23, since the tape T from the supply is prevented from moving with the shear blade 23 by the engagement of the tape between the crease wheel 32 and guide wheel 34. The parts of the machine are then in the position in which they are shown in FIGURE 7.

As soon as the first shear member 12 has completed the reciprocating movement, the tape T from the supply is again fed toward the shear members and crease wheel 32 is rotated in the clockwise direction when viewed as shown in FIGURE 1 and the guide wheel 34 is caused to be rotated in the counterclockwise direction in order to advance the tape T from the supply through the aperture 31 in the shear blade 23 until the tape T is in the position in which it is shown in FIGURE 1, and the machine is then ready for another complete tape severing and applying operation.

It will be understood that the shear blade 16 can move on the swivel pin 18 during the severing operation, in order that it can become aligned wiht the shear blade 23 along the area of contact of the shear blades with each other and thus provide for complete contact along the shearing surfaces. I have found that the attachment of an oiling wick to contact with the edge 20 of shear blade 16 when that blade is in the rest position will cause oil to be carried onto the blade 23 during the operation of the machine and aids in the sliding of the blade 16 along the blade 23 during the operation of the machine.

Variations in the above described apparatus can be envisioned. For example, the second shear member can be cam operated so that it need not rotate on a pivot, and the first shear member can be arranged on an arcuate or circular frame so that it could be said not to move in a reciprocating movement. Such variations are comprehended and I do not intend to be limited only to the specific embodiment herein disclosed, but, rather I intend to be limited by my disclosure taken as a whole, including the appended claims.

I claim:

1. An apparatus for severing a length of adhesive tape from a supply thereof, said apparatus comprising a supporting structure, a first shear member attached to said supporting structure for reciprocating movement, means for moving said first shear member in said reciprocating movement, a second shear member pivotally attached to said supporting structure and spring means for biasing said second shear member toward said first shear member, said second shear member being attached to said supporting structure in a position adjacent to said first shear member so that said second shear member is contacted by said first shear member and caused to be rotated in one direction on said pivot when said first shear member is moved in one direction to sever said tape which extends between said first shear member and said second shear member and the adhesive surface of the end of tape from said supply thereof is caused to become adhered to said second shear member, and, when said first shear member is moved in the opposite direction, said second shear member is rotated in the opposite direction on said pivot by said spring means to cause said end of tape from said supply thereof to become disadhered from said second shear member.

2. An apparatus for severing a length of adhesive tape from a supply thereof, said apparatus comprising a supporting structure, a first shear blade swiveled to said supporting structure and attached for reciprocating movement on said supporting structure, means for moving said first shear blade in said reciprocating movement, a second shear blade pivotally attached to said supporting structure and spring means for biasing said second shear blade toward and into contact with said first shear blade, said second shear blade having a centrally positioned aperture therein and being attached to said supporting structure in a position adjacent to said first shear blade so that said second shear blade is caused to be rotated in one direction on said pivot when said first shear blade is moved in one direction to sever said tape which extends through said aperture and between said first shear blade and said second shear blade and the adhesive surface of the end of tape from said supply thereof is caused to become adhered to an edge of said aperture in said second shear blade, and, when said first shear blade is moved in the opposite direction, said second shear blade is rotated in the opposite direction on said pivot by said spring means to cause said end of tape from said supply thereof to become disadhered from said edge of said aperture in said second shear blade.

3. An apparatus for severing a length of adhesive tape from a supply thereof and applying said severed length of tape to an article, said apparatus comprising a supporting structure, means attached to said supporting structure for feeding tape from said supply, means for forming a longitudinal crease in tape which has been fed from said supply, a first shear blade swiveled to said supporting structure and attached for reciprocating movement on said supporting structure, an applying pad attached to said first shear blade for reciprocating movement therewith, means for moving said first shear blade and said applying pad in said reciprocating movement, a second shear blade pivotally attached to said supporting structure and means for biasing said second shear blade toward and into contact with said first shear blade, said second shear blade having a centrally positioned aperture therein and being attached to said supporting structure in a position adjacent to said first shear blade so that said second shear blade is caused to be rotated in one direction on said pivot when said first shear blade is moved in one direction to sever said creased tape which extends through said aperture and between said first shear blade and said second shear blade and the adhesive surface of the end of tape from said supply thereof is caused to become adhered to an edge of said aperture in said second shear blade, and, when said first shear blade is moved in the opposite direction, said second shear blade is rotated in the opposite direction on said pivot by said biasing means to cause said end of tape from said supply thereof to become disadhered from said edge of said aperture in said second shear blade; said severed length of tape being moved by said applying pad into adhesive engagement with said article.

References Cited

UNITED STATES PATENTS

| | | | |
|---|---|---|---|
| 2,538,520 | 1/1951 | Holt et al. | 156—270 XR |
| 2,990,081 | 6/1961 | De Neui et al. | 156—521 XR |
| 3,058,379 | 10/1962 | Gustavsson | 83—568 XR |

HAROLD ANSHER, Primary Examiner

M. E. McCAMISH, Assistant Examiner

U.S. Cl. X.R.

83—553, 568, 598; 156—523